US011024922B2

(12) United States Patent
Ji et al.

(10) Patent No.: US 11,024,922 B2
(45) Date of Patent: Jun. 1, 2021

(54) CAP ASSEMBLY COMPRISING GUIDE MEMBER FOR PREVENTING ESCAPE OF SAFETY VENT

(71) Applicant: LG Chem, Ltd., Seoul (KR)

(72) Inventors: Sang Gu Ji, Daejeon (KR); Sang Uck Kim, Daejeon (KR); Cheon Hee Bok, Daejeon (KR); Myung An Lee, Daejeon (KR); Geun Young Park, Daejeon (KR); Yong Han Kim, Daejeon (KR); Da Na Kim, Daejeon (KR)

(73) Assignee: LG Chem, Ltd.

( * ) Notice: Subject to any disclaimer, the term of this patent is extended or adjusted under 35 U.S.C. 154(b) by 64 days.

(21) Appl. No.: 16/465,364

(22) PCT Filed: Mar. 22, 2018

(86) PCT No.: PCT/KR2018/003397
§ 371 (c)(1),
(2) Date: May 30, 2019

(87) PCT Pub. No.: WO2018/174621
PCT Pub. Date: Sep. 27, 2018

(65) Prior Publication Data
US 2019/0393462 A1 Dec. 26, 2019

(30) Foreign Application Priority Data
Mar. 23, 2017 (KR) .................. 10-2017-0036732

(51) Int. Cl.
*H01M 50/35* (2021.01)
*H01M 10/52* (2006.01)
(Continued)

(52) U.S. Cl.
CPC ........... *H01M 50/35* (2021.01); *H01M 10/52* (2013.01); *H01M 50/107* (2021.01);
(Continued)

(58) Field of Classification Search
CPC . H01M 2/04–0495; H01M 2/12–1294; H01M 10/52; H01M 50/147–152;
(Continued)

(56) References Cited

U.S. PATENT DOCUMENTS 3,219,488 A * 11/1965 Southworth, Jr. .......................... H01M 50/3425
429/56
5,853,912 A * 12/1998 Naing ................... H01M 50/30
429/61
(Continued)

FOREIGN PATENT DOCUMENTS

| JP | H10247483 A | 9/1998 |
|---|---|---|
| JP | 2001216943 A | 8/2001 |

(Continued)

OTHER PUBLICATIONS

International Search Report for Application No. PCT/KR2018/003397 dated Nov. 14, 2018.
(Continued)

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

Disclosed herein is a cap assembly disposed on an open upper end part of a cylindrical can of a battery, the battery being configured to have an electrode assembly mounted in the cylindrical can, the cap assembly including a safety vent configured to rupture in order to exhaust gas when the interior pressure of the battery reaches a predetermined
(Continued)

pressure limit, an upwardly-protruding cap plate disposed on the upper part of the safety vent, the cap plate having a through-opening configured to receive the gas exhausted therethrough, a current interrupt member attached to the lower end of the safety vent, the current interrupt member configured to interrupt electric current when the interior pressure of the battery reaches the predetermined pressure limit, and a guide member attached to the inside of the cap plate, the guide member being configured to prevent escape of a ruptured portion of the safety vent.

12 Claims, 4 Drawing Sheets

(51) Int. Cl.
  *H01M 50/107* (2021.01)
  *H01M 50/147* (2021.01)
  *H01M 50/152* (2021.01)
  *H01M 50/342* (2021.01)
  *H01M 50/578* (2021.01)
(52) U.S. Cl.
  CPC ....... *H01M 50/147* (2021.01); *H01M 50/152* (2021.01); *H01M 50/3425* (2021.01); *H01M 50/578* (2021.01)
(58) Field of Classification Search
  CPC . H01M 50/155–159; H01M 50/30–35; H01M 50/367
  See application file for complete search history.

(56) References Cited

U.S. PATENT DOCUMENTS

| | | | |
|---|---|---|---|
| 7,501,197 B2 | 3/2009 | Kim | |
| 8,017,266 B2 | 9/2011 | Matsuhisa et al. | |
| 8,580,424 B2 | 11/2013 | Kim | |
| 2004/0241536 A1 | 12/2004 | Kim | |
| 2005/0214634 A1 | 9/2005 | Kim | |
| 2005/0277017 A1* | 12/2005 | Cho | H01M 50/3425 429/56 |
| 2006/0121336 A1 | 6/2006 | Yoon | |
| 2007/0212595 A1* | 9/2007 | Kim | H01M 2/34 429/53 |
| 2008/0102367 A1 | 5/2008 | Matsuhisa et al. | |
| 2010/0136388 A1* | 6/2010 | Kim | H01M 2/1241 429/56 |
| 2010/0316894 A1* | 12/2010 | Hermann | H01M 50/3425 429/56 |
| 2011/0008654 A1 | 1/2011 | Kim et al. | |
| 2011/0086251 A1* | 4/2011 | Kim | H01M 2/0413 429/53 |
| 2011/0200854 A1* | 8/2011 | Bak | H01M 50/3425 429/56 |
| 2014/0045009 A1 | 2/2014 | Kim | |
| 2017/0141370 A1* | 5/2017 | Uchida | H01M 2/0413 |
| 2017/0187019 A1* | 6/2017 | Chun | H01M 2/04 |

FOREIGN PATENT DOCUMENTS

| | | | |
|---|---|---|---|
| JP | 2006147564 A | 6/2006 | |
| JP | 2008084845 A | 4/2008 | |
| JP | 2012506107 A | 3/2012 | |
| KR | 20040101651 A | 12/2004 | |
| KR | 20050095949 A | 10/2005 | |
| KR | 100528915 B1 | 11/2005 | |
| KR | 100578804 B1 | 5/2006 | |
| KR | 20090095334 A | 9/2009 | |
| KR | 20110075789 A | 7/2011 | |
| KR | 101097101 B1 | 12/2011 | |
| KR | 20130033716 A | 4/2013 | |
| KR | 101292534 B1 | 8/2013 | |
| KR | 20140020481 A | 2/2014 | |
| KR | 101396703 B1 | 5/2014 | |
| KR | 20140106328 A | 9/2014 | |
| KR | 101523064 B1 | 5/2015 | |
| KR | 20150051518 A | 5/2015 | |
| KR | 20160034794 A | 3/2016 | |
| KR | 20160074057 A | 6/2016 | |
| KR | 101772266 B1 | 8/2017 | |
| KR | 101826879 B1 | 2/2018 | |
| KR | 101916964 B1 | 11/2018 | |
| WO | WO-2015182136 A1 * | 12/2015 | ............ H01M 2/023 |

OTHER PUBLICATIONS

Extended European Search Report including Written Opinion for Application No. EP18770229.5 dated Dec. 5, 2019.

* cited by examiner

[Fig.1]
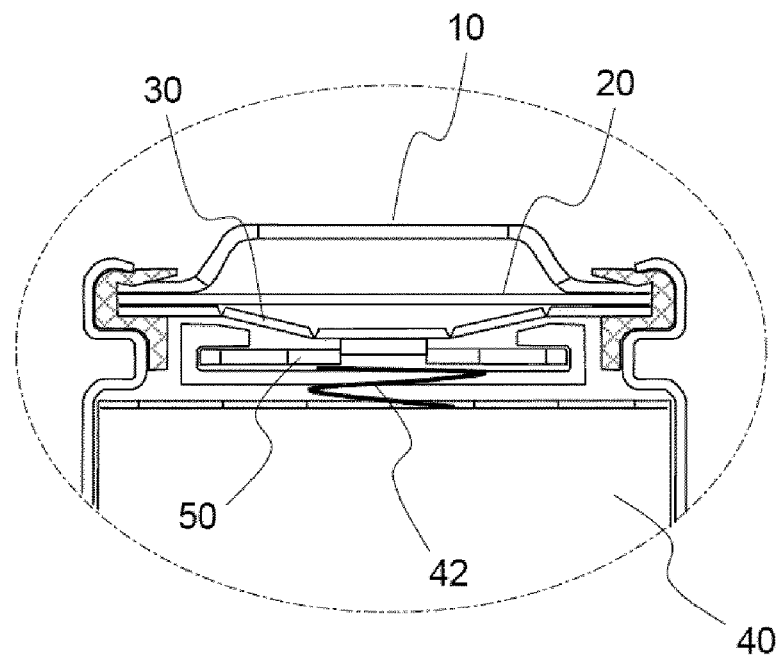
[Fig.2]
30
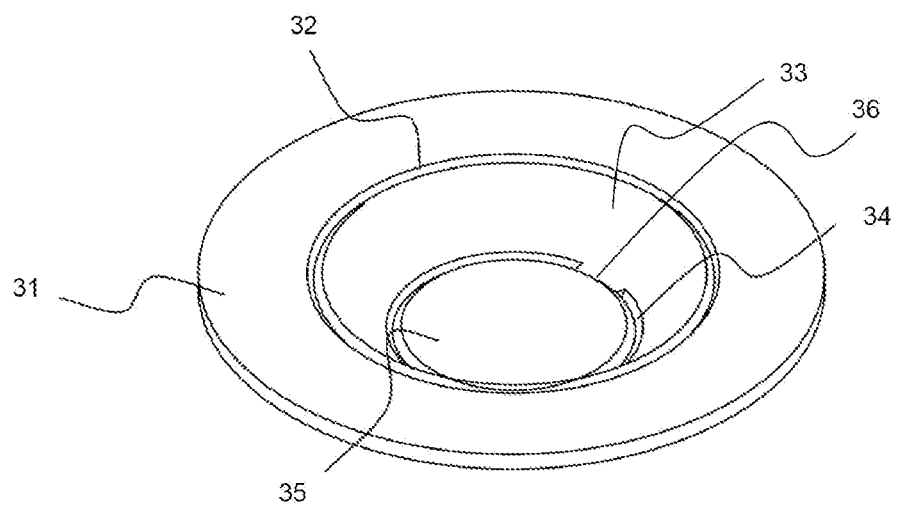

[Fig.3]
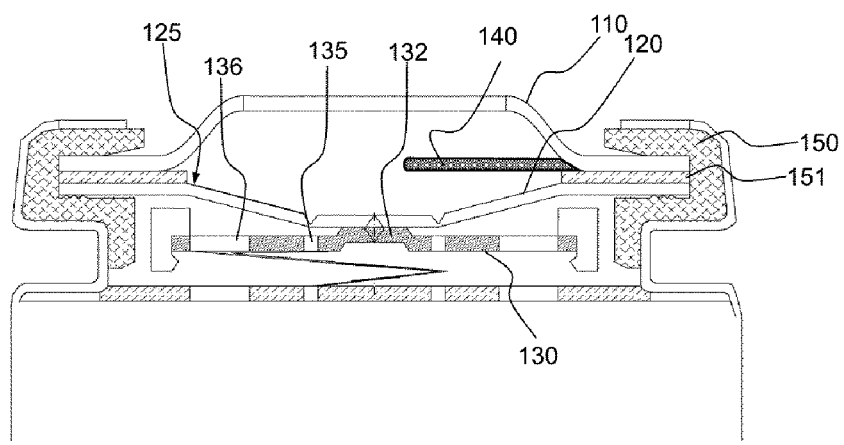
[Fig.4]
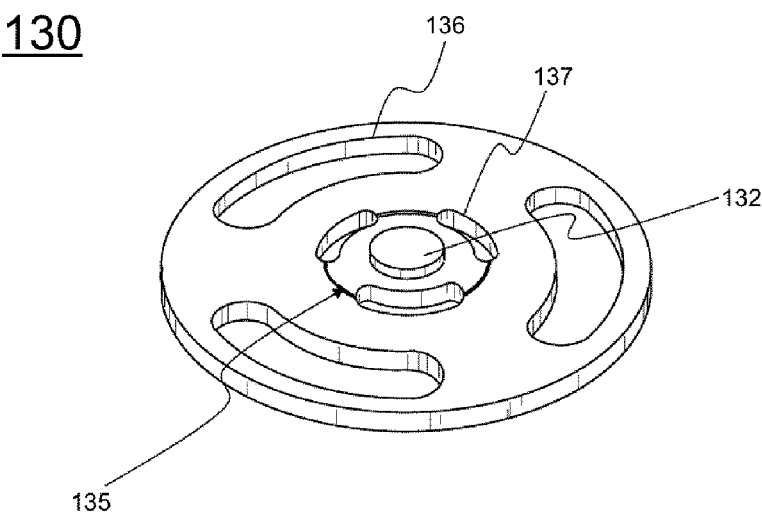

【Fig.5】
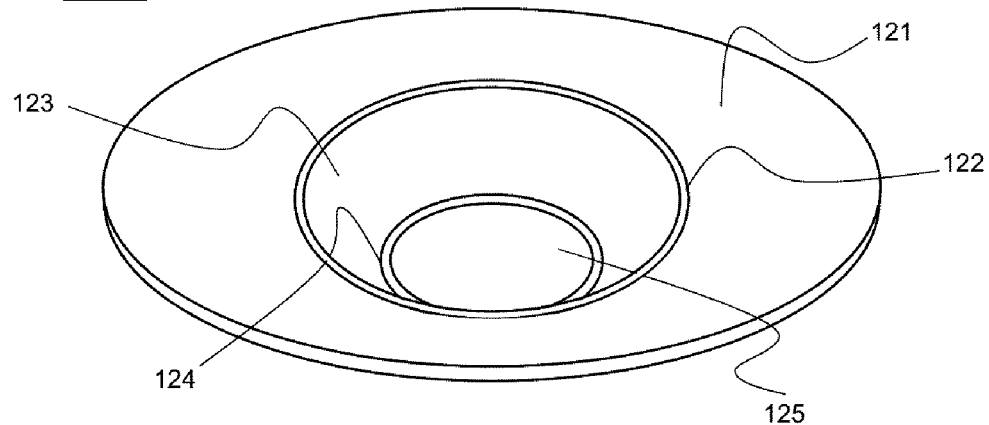
【Fig.6】
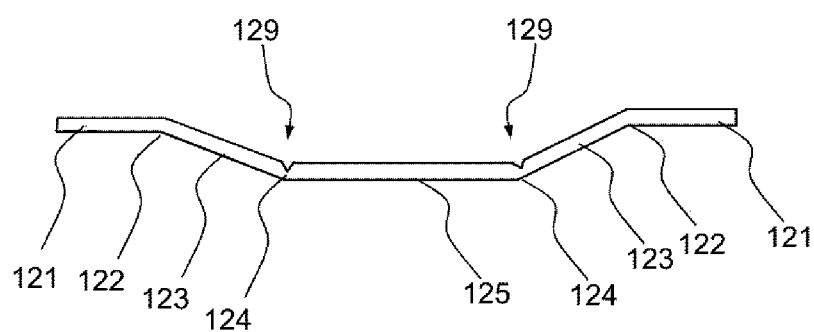

【Fig.7】
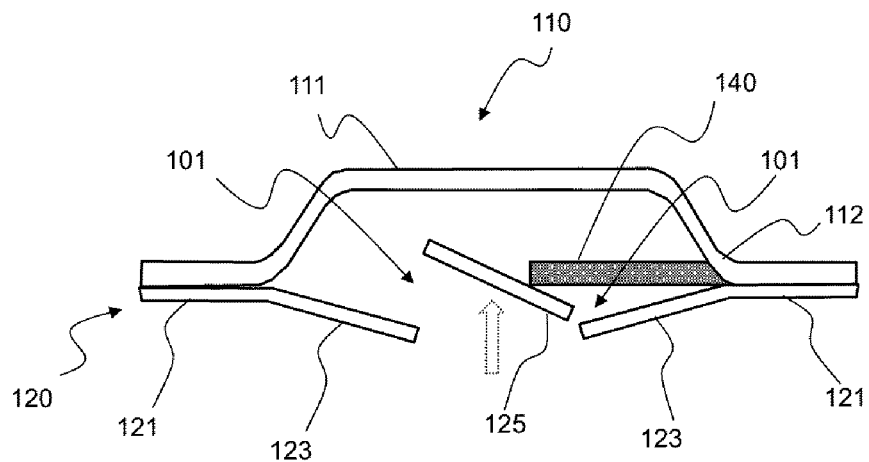
【Fig.8】
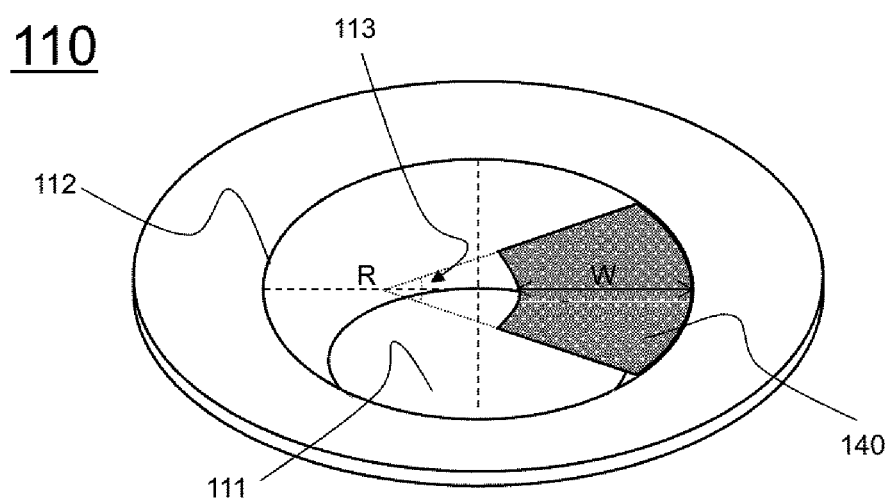

CAP ASSEMBLY COMPRISING GUIDE MEMBER FOR PREVENTING ESCAPE OF SAFETY VENT

CROSS-REFERENCE TO RELATED APPLICATIONS

This application is a national phase entry under 35 U.S.C. § 371 of International Patent Application No. PCT/KR2018/003397, filed on Mar. 22, 2018, published in Korean, which claims priority from Korean Patent Application No. 10-2017-0036732, filed on Mar. 23, 2017, the disclosures of which are hereby incorporated herein by reference.

TECHNICAL FIELD

The present invention relates to a cap assembly including a guide member for preventing the escape of a safety vent.

BACKGROUND ART

As mobile devices have been continually developed and the demand for such mobile devices has increased, the demand for secondary batteries as energy sources for such mobile devices has sharply increased. Among such secondary batteries is a lithium secondary battery, having high energy density and high discharge voltage, into which much research has been carried out and which has now been commercialized and is being widely used.

Secondary batteries may be classified based on the shape of a battery case of each of the secondary batteries into a cylindrical battery, configured to have a structure in which an electrode assembly is mounted in a cylindrical metal can, a prismatic battery, configured to have a structure in which an electrode assembly is mounted in a prismatic metal can, and a pouch-shaped battery, configured to have a structure in which an electrode assembly is mounted in a pouch-shaped case made of an aluminum laminate sheet. Among these batteries, the cylindrical battery has advantages in that the capacity of the cylindrical battery is relatively large and in that the cylindrical battery is structurally stable.

An electrode assembly, which is mounted in a battery case, is a power-generating element that has a structure including a positive electrode, a negative electrode, and a separator interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, a stacked type electrode assembly, which is configured to have a structure in which a plurality of positive electrodes having a predetermined size and a plurality of negative electrodes having a predetermined size are sequentially stacked in the state in which separators are interposed respectively between the positive electrodes and the negative electrodes, or a stacked/folded type electrode assembly, which is configured to have a structure in which unit cells, such as full cells or bi-cells, are wound using a separation film. Among these electrode assemblies, the jelly-roll type electrode assembly has advantages in that it is possible to easily manufacture the jelly-roll type electrode assembly and in that the jelly-roll type electrode assembly has high energy density per unit weight.

FIG. 1 is a vertical sectional view schematically showing a top assembly of a general cylindrical battery, and FIG. 2 is a schematic perspective view of a safety vent shown in FIG. 1.

Referring to FIGS. 1 and 2, a top cap 10 is configured to protrude upwards. Under the top cap 10 are sequentially located a positive temperature coefficient (PTC) element 20 for interrupting electric current through a great increase in battery resistance when the interior temperature of the battery increases, a safety vent 30 configured to protrude downwards in a normal state and configured to rupture while protruding upwards in order to exhaust gas when the interior pressure of the battery increases, and a connection plate 50, one side of the upper end of which is coupled to the safety vent 30 and one side of the lower end of which is connected to a positive electrode of an electrode assembly 40 by a connection 42.

The safety vent 30 is configured to have a structure in which a circular central part of the safety vent 30 is concave overall. The concave central part is provided with a flat portion 35, and the outer circumferential surface of the flat portion 35 is constituted by an inclined surface 33, the circumference of which gradually increases upwards. The upper part of the inclined surface is bent outwards so as to form an outer circumferential surface 31, which is parallel to the flat portion 35. In a first bent portion 32 between the outer circumferential surface 31 and the inclined surface 33 and in a second bent portion 34 between the inclined surface 33 and the flat portion 35 are formed notches, by which the concave portion is easily deformed into a convex portion such that the concave part is separated from the remaining portion of the safety vent 30 when the interior pressure of the battery increases.

The flat portion 35 and the inclined surface 33 are weakly coupled to each other along most of the second bent portion 34 due to the notch structure. However, the flat portion 35 and the inclined surface 33 are strongly coupled to each other at a part 36 of the second bent portion 34 by welding such that the separated flat portion 35 is prevented from escaping from the inclined surface 33.

Since the flat portion is coupled to the inclined surface by welding, as described above, the safety vent is not completely open even when the safety vent ruptures as the interior pressure of the battery cell increases. In addition, the space between the safety vent and the top cap or the PTC element is very small. Consequently, it is difficult to secure a wide gas exhaust path.

Therefore, there is an urgent necessity for technology that is capable of securing a wide gas exhaust path in order to rapidly exhaust gas from the battery cell.

DISCLOSURE

Technical Problem

The present invention has been made to solve the above problems and other technical problems that have yet to be resolved.

As a result of a variety of extensive and intensive studies and experiments to solve the problems described above, the inventors of the present application have found that, in the case in which a safety vent, which constitutes a cap assembly of a cylindrical can, ruptures and is separated from the cap assembly due to an increase in the interior pressure of a battery, as will be described below, it is possible to secure a wide gas exhaust path by attaching a guide member to the inside of a cap plate in order to prevent the escape of the ruptured portion of the safety vent. The present invention has been completed based on these findings.

Technical Solution

In accordance with an aspect of the present invention, the above and other objects can be accomplished by the provision of a cap assembly disposed on an open upper end part of a cylindrical can of a battery, the battery being configured to have an electrode assembly mounted in the cylindrical can, the cap assembly including a safety vent configured to rupture in order to exhaust gas when the interior pressure of the battery reaches a predetermined pressure limit, an upwardly-protruding cap plate disposed on the upper part of the safety vent, the cap plate having a through-opening configured to receive the gas exhausted therethrough, a current interrupt member attached to the lower end of the safety vent, the current interrupt member configured to interrupt electric current when the interior pressure of the battery reaches the predetermined pressure limit, and a guide member attached to the inside of the cap plate, the guide member being configured to prevent escape of a ruptured portion of the safety vent.

As described above, the cap assembly according to the present invention is configured to have a structure in which the guide member is attached to the inside of the cap plate, and is also configured to have a structure in which, when the interior pressure of the battery increases, an inside bent portion of the safety vent completely ruptures and is separated from the remaining portion of the safety vent. Consequently, it is possible to widen the gas exhaust path, which may increase the interior pressure of the battery if narrow, whereby it is possible to safely and rapidly exhaust gas.

Consequently, it is possible to solve the problem with the conventional art, in which, when the safety vent is ruptured in order to exhaust gas from the battery, a part of the bent portion of the safety vent is broken but another part of the bent portion of the safety vent is not broken, whereby the safety vent is not completely open and thus it is difficult to secure a path for exhausting gas from the battery.

In addition, it is not necessary to perform a coupling method, such as welding, in order to prevent a part of the bent portion of the safety vent from being ruptured, unlike the conventional art, whereby it is possible to further simplify a process of manufacturing the battery and thus to improve productivity.

During charging and discharging of the cylindrical battery cell, gas is generated in the battery cell, whereby the interior pressure of the battery cell increases. In the case in which the interior pressure of the battery cell exceeds a predetermined level, a portion of the safety vent ruptures, whereby gas is exhausted.

Consequently, the guide member may be configured to prevent upward movement of the ruptured portion of the safety vent toward the cap plate, the ruptured portion of the safety vent configured to be separated from a remaining portion of the safety vent when the interior pressure of the battery reaches the predetermined pressure limit in order to prevent the separated portion of the safety vent from colliding with the cap plate.

In a concrete example, the safety vent may include a first bent portion extending downwards from an outer circumferential side, an inclined portion extending downwards from the first bent portion, and a second bent portion extending horizontally from the inclined portion toward a center portion, and a notch configured to induce rupture of the safety vent when the interior pressure of the battery reaches the predetermined limit may be formed in one of the first bent portion or the second bent portion. That is, the safety vent may be configured to have a structure in which the safety vent is concave downwards due to the first bent portion and the second bent portion, or may be configured to have a structure in which a notch is formed in the second bent portion such that the notch is broken in order to exhaust gas to the outside when the interior pressure of the battery increases.

The safety vent may be configured to have a structure in which the shape of the safety vent is inverted when the interior pressure of the battery increases such that the concave portion of the safety vent becomes convex upwards and in which the notch formed in the second bent portion is broken when the interior pressure of the battery increases further.

Alternatively, the safety vent may be configured to have a structure in which the notch formed in the second bent portion is broken even in the state in which the safety vent is concave without the shape of the safety vent being inverted when the interior pressure of the battery increases.

The current interrupt member is a member that ruptures in order to interrupt electric current when the interior pressure of the battery increases. Specifically, the current interrupt member may have a central upwardly-protruding portion attached to the lower end of the safety vent by welding, etc., and two or more through-openings configured to receive the gas exhausted therethrough.

When the interior pressure of the battery increases, the shape of the safety vent is inverted, whereby the connection portion between the current interrupt member and a positive electrode of the electrode assembly ruptures, whereby electric current is interrupted. A notch may be formed in the outer circumferential surface of the protruding portion. As the shape of the safety vent is inverted, the notch may rupture, whereby the protruding portion may be easily separated from the connection portion between the current interrupt member and the positive electrode of the electrode assembly in the state of being coupled to the safety vent.

The through-openings of the current interrupt member may each have an arc shape and may be formed in a radially symmetrical arrangement about the center of the current interrupt member. In the case in which the through-openings are formed in a radially symmetrical arrangement, as described above, it is possible to prevent an excessive amount of gas from being exhausted in one direction and to secure the rigidity of the current interrupt member.

In a concrete example, the second bent portion may be formed as a notch having the shape of a closed curve. When the interior pressure of the battery increases, therefore, the entirety of the second bent portion, which has the shape of a closed curve, may easily rupture. Consequently, the central portion of the safety vent, which ruptures in the planar shape of a circle, may be easily separated from the remaining part of the safety vent.

The guide member is a member that secures a wide gas exhaust path while preventing the ruptured portion of the safety vent from moving upwards and completely escaping. The guide member may extend from the outer circumferential portion of the lower surface of the cap plate toward the center of the cap plate.

The guide member may have a width in a radial direction of the cap plate of 0.3 to 1.0 times a radius of a lower surface of a protruding central portion of the cap plate. In the case in which the width of the guide member is less than 0.3 R, it is difficult to prevent the escape of the safety vent that ruptures and moves upwards. In the case in which the width of the guide member is greater than 1 R, the angle of the inclined surface formed by the ruptured portion of the safety vent becomes small, whereby it is difficult to secure a gas exhaust path.

A gas exhaust path that is as wide as possible may be secured by the guide member in order to rapidly exhaust gas from the battery. The guide member may extend across an angle of 10 to 90 degrees in a circumferential direction of the cap plate.

In the case in which the guide member has a central angle of less than 10 degrees based on a planar circle having the lower surface of the protruding portion of the cap plate as the outer circumferential side thereof, it may be difficult to prevent the escape of the safety vent, which instantaneously rapidly moves upwards, which is undesirable. In the case in which the guide member has a central angle of greater than 90 degrees, the safety vent is blocked by the guide member and vertically moves upwards even though the safety vent is completely separated, whereby it is difficult to secure a wide gas exhaust path, which is also undesirable.

The safety vent may be configured such that, when the interior pressure of the battery reaches the predetermined pressure limit, the notch formed in the second bent portion may be broken, such that the center portion is separated from the inclined portion.

The separated flat portion may be inclined so as to have an inclined surface with respect to the ground in order to form a gas exhaust path.

In the cap assembly according to the present invention, as described above, the guide member is attached to the lower surface of the cap plate. Consequently, the upward movement of one side surface of the separated flat portion is restrained by the guide member. As a result, when the interior pressure of the battery reaches the predetermined pressure limit, thereby breaking the notch, the separated center portion of the safety vent does not vertically move upwards in the state of being parallel to the ground but is inclined relative to a horizontal plane of the circumferential side of the safety vent.

For example, when the center portion of the safety vent is disposed in the inclined position, a lower part of the center portion may be disposed adjacent to a lower surface of the guide member, and an upper part of the center portion may be disposed opposite the lower surface of the guide member. Consequently, it is possible to form a wider gas exhaust path at the upper side of the inclined surface, whereby it is possible to rapidly and safely exhaust gas.

Depending on the circumstances, the cap assembly may further include a positive temperature coefficient (PTC) element for interrupting electric current through a great increase in battery resistance when the interior temperature of the battery increases. The PTC element may be interposed, for example, between a top cap and the safety vent.

The cap assembly may be configured to have a structure in which the current interrupt member, a gasket for the current interrupt member, the safety vent, the PTC element, and the top cap, which has therein one or more gas exhaust ports, are stacked, or may be configured to have a structure in which a gasket is further mounted to the outer circumferential surface of the stacked structure.

The electrode assembly may be, for example, a jelly-roll type electrode assembly, which is configured to have a structure in which a positive electrode and a negative electrode are wound in the state in which a separator is interposed between the positive electrode and the negative electrode. However, the present invention is not limited thereto.

The material for the cylindrical can is not particularly restricted. For example, the cylindrical can may be made of stainless steel, steel, aluminum, or any one of alloys thereof.

In accordance with another aspect of the present invention, there is provided a cylindrical battery including the cap assembly. The cylindrical battery may be a lithium secondary battery, which exhibits high energy density, discharge voltage, and output stability. However, the present invention is not limited thereto.

BRIEF DESCRIPTION OF DRAWINGS

FIG. 1 is a vertical sectional view showing a top assembly of a general cylindrical battery;

FIG. 2 is a perspective view of a safety vent shown in FIG. 1;

FIG. 3 is a vertical sectional view showing a top assembly according to an embodiment of the present invention;

FIG. 4 is a perspective view of a current interrupt member shown in FIG. 3;

FIG. 5 is a perspective view of a safety vent shown in FIG. 3;

FIG. 6 is a side view of the safety vent shown in FIG. 3;

FIG. 7 is a side view schematically showing the state in which the safety vent shown in FIG. 3 has ruptured; and FIG. 8 is a bottom view of a cap plate, to which a guide member shown in FIG. 3 is attached.

BEST MODE

Now, exemplary embodiments of the present invention will be described in detail with reference to the accompanying drawings. It should be noted, however, that the scope of the present invention is not limited by the illustrated embodiments.

FIG. 3 is a vertical sectional view showing a top assembly according to an embodiment of the present invention, and FIG. 4 is a perspective view of a current interrupt member shown in FIG. 3.

Referring to FIGS. 3 and 4, a cap assembly 100 includes a safety vent 120 configured to rupture in order to exhaust gas when the interior pressure of a battery increases, an upward-protrusion type cap plate 110 loaded on the upper part of the safety vent 120, the cap plate being provided with a through-opening, through which gas is exhausted, a current interrupt member 130 attached to the lower end of the safety vent for interrupting electric current when the interior pressure of the battery increases, and a guide member 140 for preventing a ruptured portion of the safety vent from escaping from the original position thereof and colliding with a top cap.

A positive temperature coefficient (PTC) element 151 is interposed between the cap plate 110 and the safety vent 120, and a gasket 150 is further mounted so as to wrap the outer circumferential surfaces of the cap plate 110, the PTC element 151, and the safety vent 120.

The current interrupt member 130 is a member that ruptures to interrupt electric current when the interior pressure of the battery increases. A protruding portion 132, which is attached to the lower end of the safety vent 120 by welding, is formed at the center of the current interrupt member so as to protrude upwards, and three through-holes 137 and notches 135 interconnecting the through-holes 137 are concentrically formed about the protruding portion 132 to constitute a bridge.

In addition, three through-openings 136, through which gas is exhausted, are formed in the outer circumferential surface of the current interrupt member 130 in a radially symmetrical arrangement about a central axis while having an arc shape.

When the safety vent 120 ruptures as the interior pressure of the battery cell increases, the connection portion between the current interrupt member 130 and a positive electrode of an electrode assembly is broken, whereby electric current is interrupted. The notches 135 are formed in the outer circumferential surface of the protruding portion 132. When the safety vent 120 ruptures, the notches 135 are broken, whereby the protruding portion 132 is separated from the connection portion between the current interrupt member 130 and the positive electrode of the electrode assembly.

FIG. 5 is a perspective view of the safety vent shown in FIG. 3, and FIG. 6 is a side view of the safety vent shown in FIG. 3.

Referring to FIGS. 5 and 6, the safety vent 120 includes a first bent portion 122 bent downwards from an outer circumferential side 121 thereof, an inclined portion 123 extending downwards from the first bent portion 122, a second bent portion 124 bent horizontally from the inclined portion 123 toward the center thereof, and a flat portion 125 formed at the center thereof so as to be parallel to the ground.

The second bent portion 124 is provided with a notch 129 having the shape of a closed curve. When the notch ruptures as the interior pressure of the battery increases, therefore, the flat portion 125 is completely separated from the inclined portion.

FIG. 7 is a side view schematically showing the state in which the safety vent shown in FIG. 3 has ruptured.

Referring to FIG. 7, the safety vent 120 remains concave in the state in which the outer circumferential side 121 and the inclined portion 123 are connected to each other but the flat portion 125 has been separated from the inclined portion 123 and moved toward the cap plate.

The guide member 140, which extends toward the center of the cap plate, is attached to an outer circumferential side 112 of the cap plate 110, which is located under a protruding portion 111 of the cap plate 110. The guide member 140 contacts a portion of the flat portion 125 that has moved toward the cap plate such that the flat portion 125 has an inclined surface with respect to the ground. That is, the lower part of the inclined surface is located at the lower surface of the guide member 140, and the upper part of the inclined surface is located so as to be opposite the lower surface of the guide member. As a result, gas may be exhausted through a space 101 defined between the flat portion 125, which is in an inclined state, and the inclined portion 123. Consequently, it is possible to form a gas exhaust path at the circumference of the flat portion in all directions, whereby it is possible to rapidly and safely exhaust gas.

FIG. 8 is a bottom view of the cap plate shown in FIG. 3.

Referring to FIG. 8, the lower surface of the cap plate 110 is defined by the outer circumferential side 112, which has a planar radius greater than the planar radius of the protruding portion 111 of the cap plate 110, and the guide member 140, which extends toward the center of the cap plate, is attached to the outer circumferential side 112.

The guide member 140 is shown as being formed in a fan shape, the apex of which has been removed. However, the present invention is not limited thereto. The guide member may be formed in a bar shape, a linear shape, or a polygonal shape.

The width W of the guide member has a range of 0.3 R to 1 R based on the radius R of the lower surface of the protruding portion of the cap plate, and the guide member may be formed so as to have a central angle 113 of 10 to 90 degrees based on the circumference of the outer circumferential side 112, which is circular when viewed in a plan view and encompasses 360 degrees.

Since the cap assembly according to the present invention is configured such that the guide member is attached to the lower surface of the cap plate, as described above, a portion of the safety vent is prevented from moving upwards by the guide member and is inclined even when the portion of the safety vent ruptures and is separated from the remaining portion of the safety vent, whereby it is possible to rapidly and safely exhaust gas from the circumference of the separated portion of the safety vent in all directions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the cap assembly according to the present invention is configured such that the guide member is attached to the inside of the cap plate in order to prevent the escape of the safety vent, which ruptures in order to exhaust gas when the interior pressure of the battery increases, whereby the ruptured portion of the safety vent is completely separated from the remaining portion of the safety vent. Consequently, it is possible to secure a wide gas exhaust path, and it is also possible to prevent the ruptured portion of the safety vent from colliding with the cap plate.

In addition, it is possible to omit a process of forming a fixed portion, such as welding, in order to prevent the safety vent from being completely separated while rupturing, whereby it is possible to simplify the process of manufacturing the battery cell.

The invention claimed is:

1. A cap assembly disposed on an open upper end part of a cylindrical can of a battery, the battery being configured to have an electrode assembly mounted in the cylindrical can, the cap assembly comprising:
   a safety vent configured to rupture in order to exhaust gas when an interior pressure of the battery reaches a predetermined pressure limit;
   an upwardly-protruding cap plate disposed on an upper part of the safety vent, the cap plate having a through-opening configured to receive the gas exhausted therethrough;
   a current interrupt member attached to a lower end of the safety vent, the current interrupt member configured to interrupt electric current when the interior pressure of the battery reaches the predetermined pressure limit; and
   a guide member attached to an inside of the cap plate, the guide member being configured to prevent escape of a center portion of the safety vent when the safety vent is ruptured, the guide member extending radially inward from a single side of the cap assembly and overlying a single side portion of the center portion of the safety vent,
   wherein the safety vent is configured such that, when the interior pressure of the battery reaches the predetermined pressure limit, the center portion of the safety vent is fully detached from a remaining portion of the safety vent and contacts the guide member, thereby disposing the center portion in an inclined position relative to a horizontal plane of a circumferential side of the safety vent, forming a gas exhaust path.

2. The cap assembly according to claim 1, wherein the guide member is configured to prevent upward movement of the center portion of the safety vent toward the cap plate when the safety vent is ruptured.

3. The cap assembly according to claim 1, wherein
the safety vent comprises a first bent portion extending downwards from an outer circumferential side, an inclined portion extending downwards from the first bent portion, and a second bent portion extending horizontally from the inclined portion toward the center portion, and
a notch configured to induce rupture of the safety vent when the interior pressure of the battery reaches the predetermined pressure limit is formed in one of the first bent portion or the second bent portion.

4. The cap assembly according to claim 3, wherein the first bent portion is formed as a notch having a shape of a closed curve.

5. The cap assembly according to claim 3, wherein the safety vent is configured such that, when the interior pressure of the battery reaches the predetermined pressure limit, the notch formed in the second bent portion is broken, such that the center portion is separated from the inclined portion.

6. The cap assembly according to claim 1, wherein the current interrupt member has a central upwardly-protruding portion attached to a lower end of the safety vent and two or more through-openings configured to receive the gas exhausted therethrough.

7. The cap assembly according to claim 6, wherein the through-openings of the current interrupt member each have an arc shape and are formed in a radially symmetrical arrangement about a center of the current interrupt member.

8. The cap assembly according to claim 1, wherein the guide member extends from an outer circumferential portion of a lower surface of the cap plate toward a center of the cap plate.

9. The cap assembly according to claim 1, wherein the guide member has a width in a radial direction of the cap plate of 0.3 to 1.0 times a radius of a lower surface of a central portion of the cap plate.

10. The cap assembly according to claim 1, wherein the guide member extends across an angle of 10 to 90 degrees in a circumferential direction of the cap plate.

11. The cap assembly according to claim 1, wherein when the center portion of the safety vent is disposed in the inclined position, a lower part of the center portion is disposed adjacent to a lower surface of the guide member, and an upper part of the center portion is disposed opposite the lower surface of the guide member.

12. A cylindrical battery cell comprising a cap assembly according claim 1.

* * * * *